J. H. BRIGGS.
TRAMWAY AND RAILWAY TRACK OR RAIL.
APPLICATION FILED DEC. 9, 1907.
904,174.
Patented Nov. 17, 1908.
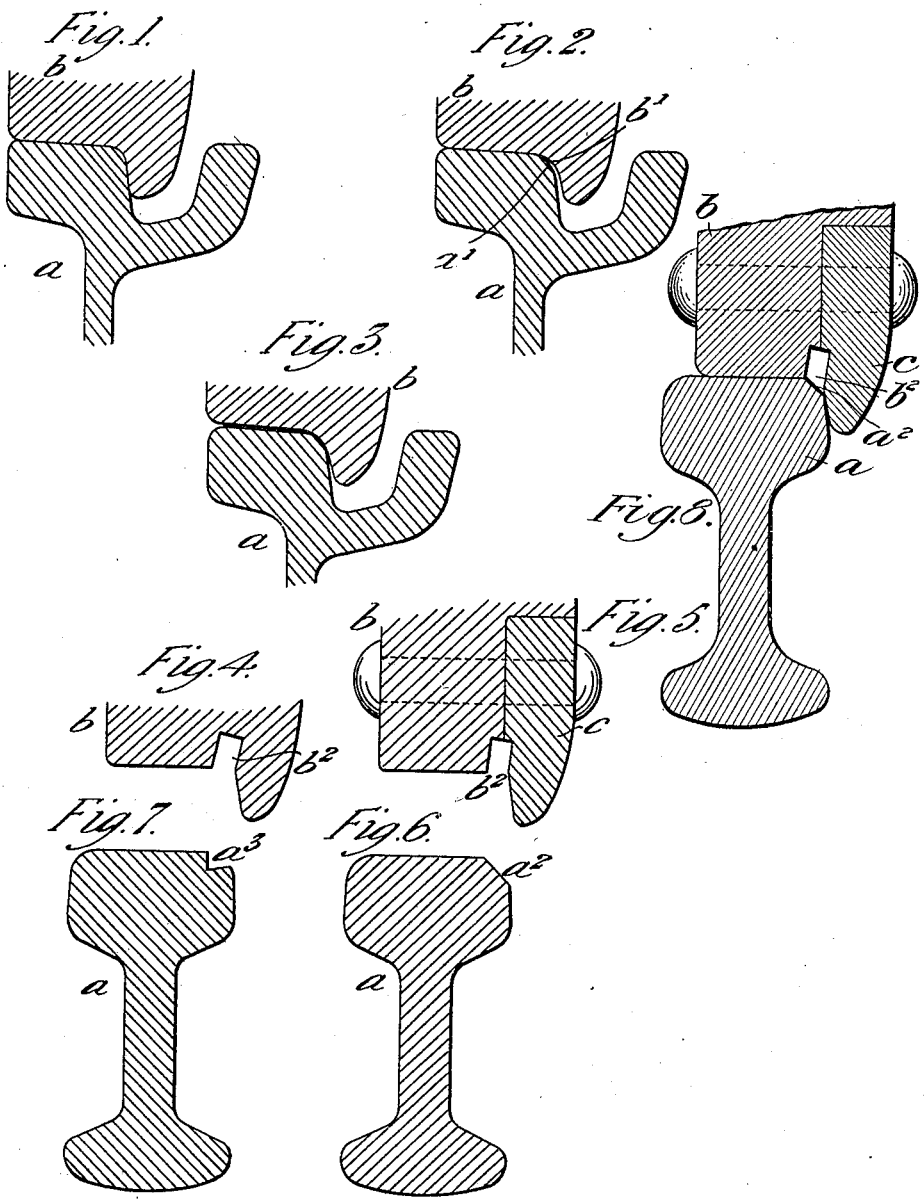

UNITED STATES PATENT OFFICE.

JAMES HAINSWORTH BRIGGS, OF LEEDS, ENGLAND.

TRAMWAY AND RAILWAY TRACK OR RAIL.

No. 904,174.  Specification of Letters Patent.  Patented Nov. 17, 1908.

Application filed December 9, 1907.  Serial No. 405,680.

*To all whom it may concern:*

Be it known that I, JAMES HAINSWORTH BRIGGS, a subject of the King of Great Britain, residing at 13 Claremont road, Headingley, Leeds, in the West Riding of Yorkshire, England, ironmonger, have invented certain new and useful Improvements in or Relating to Tramway and Railway Tracks or Rails, of which the following is a specification.

It is found that so long as tramway or other rails and the tires of wheels running on them are not worn so as to affect the contours of their surfaces, lateral corrugations are not formed on the rails, and that when such corrugations do form they appear first and mostly on the outer rails on curves of medium or large radius. It would appear that the formation of such corrugations is due to a large extent to the pressure of the wheel flanges on one rail due to the camber of the road, or to the end thrust on the wheels in traversing curves, and to the stresses to which the wheel and wheel axle are subjected under such circumstances.

The invention is illustrated in the accompanying drawings in which

Figure 1 is a section of portions of a wheel tire and rail properly fitting one with the other; Figs. 2 and 3 are sections of corresponding portions in a worn state; Fig. 4 is a section of a portion of a tire formed according to this invention; Fig. 5 is a similar section of a modified form of tire; Figs. 6 and 7 are sections of rails formed according to this invention; and Fig. 8 is a section showing the parts represented in Figs. 5 and 6 fitting together.

With new rails $a$ and properly fitting wheels $b$ as shown in Fig. 1 of the accompanying drawings, there is no tendency to corrugation but when the gage angle of the rail becomes rounded off and the wheel tread and the flange on the gage side are worn, two inclined surfaces $b'$, $a'$ Fig. 2, are thereby formed respectively on the tire and rail, which surfaces are so related to each other that when the wheel is subjected to an end thrust as it would be in traversing a curve, at which time the car tends to travel cornerwise, or a laterally inclined part of the track, the inclined surface on the leading outer wheel and trailing inner wheel in the one case or on both lower wheels in the other case will climb that of the rails on which they are running sufficiently to relieve the crown of the rail to a greater or less extent from the pressure to which it is normally subjected, as shown in Fig. 3, until slipping occurs, thereby in the case of wheels traversing a curve, relieving the wheel axle of such torsional strain as may have accumulated during the period when the wheel tread is bearing with its full weight on the crown of the rail and slipping is *nil* or small, and the wheel tread drops again onto the crown of the rail. This action being repeated as the vehicle passes around the curve or traverses a part of the road in which one rail is lower than the other, these wheels are thus subjected to an intermittent lateral thrust against the rail and consequent climbing action, and this intermittent action is considered by the present applicant to be the principal cause of the lateral corrugation of the rails. Accordingly, to eliminate this cause and thus obtain immunity from such corrugations and at the same time to promote smooth running of the vehicles, it is proposed according to the present invention to provide means whereby the establishment or formation of the two coöperating inclined surfaces above referred to is prevented and this is accomplished either by preventing the formation of the rounded corner in the wheel or alternatively or in addition thereto, by altering the section of the rails at places subject to corrugation by cutting off the gage angle as shown at $a^2$ (Fig. 6) or forming a groove $a^3$ (Fig. 7) along this corner of the rail so as to form a void between it and the contacting wheel.

To prevent the formation of the rounded corner in the wheel the tire may be formed with a circumferential groove $b^2$ (Fig. 4) of suitable size and shape in or near the angle between the tread and the flange, which groove would preferably be inclined inwardly from the tread, in order to retain its proper relation to the rail when both tread and flange are worn. Or the flange $c$ and tire $b$ may be made separate and bolted or riveted together, and the groove $b^2$ formed entirely in one or partly in both of these parts, as shown in Fig. 5.

Each of the constructions herein described subserves the purpose of definitely separating in a functional sense the tread part and the flange part of the tire, whether in the case of the modified tire or of the modified rail, and any of these or equivalent constructions or formations of the coöperating surfaces of the rail and tire may be adopted so long as these surfaces are so formed that the tangential plane of contact between the edge of the rail and the flange of the wheel when the latter is thrust against the rail is vertical or as nearly vertical as may be conveniently attained, or in other words so that the point of contact under such conditions is as far down the edge of the rail as possible.

It has been stated that the tires of railway wheels are soon worn hollow on the face which comes into contact with the rail and when the tires are so worn the vehicle does not run so smoothly as before, the double incline produced on the tire by the wear tending to cause oscillation from side to side, and to obviate the formation of this double incline it has been proposed to form grooves at such a distance apart as to limit the bearing surface or tread of the wheel to the part between the grooves and so that the inner edges of the grooves pass frequently on to and from the wearing surface or tread of the rails as the wheel plays to and fro across the rail a distance due to the clearance between the flanges and the rail.

The construction of wheel which forms the principal feature of the present invention is distinguished from such wheels in that it is first of all designed not to prevent the formation of a double incline on the tread surface which produces these lateral oscillations of the vehicle, such double inclines being in fact not formed in wheel treads which are not substantially broader than the crown of the rail as is the case with tramway wheels, nor yet in wheels having broad treads provided they are subject to the abrading action of powerful brakes, but to prevent the formation of lateral corrugations on the rail surface which are due as already explained to a periodic climbing and drop of the wheel on the rail surface, which is of much greater frequency and due to entirely different causes than these lateral oscillations of the vehicle, and this periodic climb and drop is according to the present invention obviated by the formation of a circumferential groove in the tire which is formed in the angle between the tread portion and the flange portion thereof and which is not wholly effective for the purpose designed unless formed in that angle.

Having thus described the nature of this invention and the best means I know of carrying the same into practical effect, I claim:—

1. The herein described method of preventing the formation of lateral corrugations on railway or tramway rails which consists in forming the flange of the supporting wheels of a vehicle separate from the body part and securing it thereto with an intervening circumferential space in the angle between the inner side of the flange and the tread part of the tire.

2. The herein described method of preventing the formation of lateral corrugations on railway or tramway rails which consists in forming the supporting wheels of the vehicles with a circumferential groove in the angle between the tread portion and the flange portion thereof, said groove being inclined inwardly from the tread and separating the tread portion from the flange portion of the tire functionally, and in shaping the rail with its inner or gage angle cut away to form a void with the contacting wheel of the vehicle; substantially as described.

3. The herein described method of preventing the formation of lateral corrugations on railway or tramway rails which consists in forming the flange of the supporting wheels of the vehicle separate from the body part and securing it thereto with an intervening circumferential space between the inner side of the flange and the tread part of the tire, and in shaping the rail with its inner or gage angle cut away to form a void with the contacting wheel of the vehicle; substantially as described.

4. A vehicle supporting wheel having a tread portion, a flange portion and a circumferential groove in the angle between the tread portion and the flange portion, said groove being inclined inwardly from the tread and separating the tread portion from the flange portion functionally; substantially as described.

5. A vehicle supporting wheel having a body part, a tread portion and a flange portion separate from the body part and secured thereto with an intervening circumferential groove in the angle between the flange portion and the tread portion, said groove being inclined inwardly from the tread; substantially as described.

6. A vehicle wheel and a rail adapted to contact with the wheel and having its inner or gage angle cut away to form a void with the contacting vehicle wheel; substantially as described.

In testimony whereof I have signed my name to this specification in the presence of two subscribing witnesses.

JAMES HAINSWORTH BRIGGS.

Witnesses:
J. SUMNER MARRINER,
JOSEPH EMMOTT.